United States Patent
Ramsden (10) Patent No.: US 9,719,207 B2
(45) Date of Patent: Aug. 1, 2017

(54) THERMAL TRANSFER PRINTED POLYMERIC PHONE CASE INSERT

(71) Applicant: Conde Systems, Inc., Mobile, AL (US)

(72) Inventor: Paul Andrew Ramsden, Lewiston, ME (US)

(73) Assignee: Conde Systems, Inc., Mobile, AL (US)

( * ) Notice: Subject to any disclaimer, the term of this patent is extended or adjusted under 35 U.S.C. 154(b) by 0 days.

(21) Appl. No.: 15/014,888

(22) Filed: Feb. 3, 2016

(65) Prior Publication Data
US 2016/0221318 A1    Aug. 4, 2016

Related U.S. Application Data

(60) Provisional application No. 62/112,119, filed on Feb. 4, 2015, provisional application No. 62/112,114, filed on Feb. 4, 2015.

(51) Int. Cl.
| | |
|---|---|
| *B41M 5/52* | (2006.01) |
| *D06P 5/00* | (2006.01) |
| *D06P 5/28* | (2006.01) |
| *B32B 37/00* | (2006.01) |
| *B32B 37/06* | (2006.01) |
| *B32B 37/08* | (2006.01) |
| *B32B 37/10* | (2006.01) |
| *B32B 38/18* | (2006.01) |
| *C08J 7/04* | (2006.01) |
| *B32B 38/00* | (2006.01) |

(52) U.S. Cl.
CPC ........... *D06P 5/004* (2013.01); *B32B 37/025* (2013.01); *B32B 37/06* (2013.01); *B32B 37/08* (2013.01); *B32B 37/10* (2013.01); *B32B 38/1866* (2013.01); *B41M 5/5281* (2013.01); *C08J 7/04* (2013.01); *D06P 5/002* (2013.01); *B32B 38/145* (2013.01); *B32B 2309/02* (2013.01); *B32B 2309/04* (2013.01); *B32B 2309/105* (2013.01); *B32B 2309/12* (2013.01); *B32B 2451/00* (2013.01); *D06P 5/005* (2013.01)

(58) Field of Classification Search
CPC .... B41M 5/52; B41M 5/5218; B41M 5/5263; B41M 5/5277; B41M 5/5281; B41M 2205/02; B41M 2205/12; D06P 5/00; D06P 5/004
USPC ............................................... 503/227; 8/471
See application file for complete search history.

(56) References Cited

U.S. PATENT DOCUMENTS

| | | | | |
|---|---|---|---|---|
| 4,897,377 | A * | 1/1990 | Marbrow | B41M 5/41 428/304.4 |
| 2009/0005244 | A1 * | 1/2009 | Ramsden | B41M 5/52 503/215 |
| 2013/0079067 | A1 * | 3/2013 | Peng | H04M 1/0283 455/575.1 |

* cited by examiner

*Primary Examiner* — Bruce H Hess
(74) *Attorney, Agent, or Firm* — The Gache Law Firm, P.C.; Russell C. Gache (57) ABSTRACT

The present invention is a process of producing a decorated case insert suitable for use on a phone or tablet that applies a synthetic organic polymer coating onto a heat stabilized extruded polymeric substrate, and diffuses a set of disperse dyes in the form of an image into the polymer applied coating through the application of heat and pressure. The decorated insert is then cut to match an article or manufacture, such as a phone or tablet case, and affixed onto that case to form a decorated case.

20 Claims, 6 Drawing Sheets

THERMAL TRANSFER PRINTED POLYMERIC PHONE CASE INSERT

This application claims the benefit of filing priority under 35 U.S.C. §119 and 37 C.F.R. §1.78 of the U.S. Provisional Application Ser. No. 62/112,114 filed Feb. 4, 2015, for a Thermal Transfer Printed Polymeric Phone Case Insert, and U.S. Provisional Application Ser. No. 62/112,119 filed Feb. 4, 2015, for a Curved Acrylic Photo. All information disclosed in those prior pending provisional applications is incorporated herein by reference.

FIELD OF THE INVENTION

The present invention relates generally to dye sublimation transfer printing onto synthetic organic polymers and polymeric articles. In greater particularity, the invention relates to the process of producing a dye-sublimation receptive polymeric insert for phone and tablet cases.

BACKGROUND OF THE INVENTION

In the field of imprinting design onto articles of manufacturer using dye-sublimation, images are transferred from a carrier medium using heat and pressure to activate the printed dyes, causing them to turn gaseous through sublimation from their solid state and to subsequently diffuse into a softened polymer matrix under the influence of heat and pressure. For example, an early patent disclosing a dye sublimation transfer was presented in U.S. Pat. No. 4,021,591 issued to Devries. Another sublimation example is shown in a method of imaging a ceramic mug as disclosed in U.S. Pat. No. 4,943,684 issued to Kramer.

Certain fibrous materials such as polyester fabric and certain synthetic organic polymers such as acetyl, polycarbonate, and nylon can accept the diffusion of sublimable or disperse dyes directly and have no need to be coated before receiving the image. However, their natural ability to accept the diffusion of the dye does not ensure long term persistence of these dyes and often the image will blur or fade over time.

For this reason, and to render articles suitable for dye sublimation decoration on persistent, long-term hosts, synthetic organic coatings are typically formulated and employed to pre-coat the substrate being decorated prior to the transfer of the image. An example patent disclosing such coatings used prior to the sublimation of images onto ceramic tiles is U.S. Pat. No. 4,174,250 issued to Durand.

In the field of cell phone cases, aluminum panels have been designed for incorporation into cell phone and tablet cases and which are prepared for the reception of a transferred image by the process of dye-sublimation. These cases both protect the phone against dropping and causing damage to the screen and phone housing, and also allow a panel to be attached or fitted into the case with a customized image applied onto it. In some applications, the consumer can design and customize the phone with selected photos or graphical images of their choice. Dye sublimation is the preferred method of imaging these panels as it provides a sub-surface decoration that protects the image against scratches, abrasion, and chemical attack. Alternative direct printing processes such as ultraviolet printing that utilize a post-print coating or laminate applied after the imaging process do not provide a comparable level of durability, and is therefore not a candidate for cell phone or tablet case use.

Hence, heretofore the selection of aluminum as the preferred substrate for the coated panel has been due to the combination of the ease of coating application, the ease of cutting the metal with CNC (computer numerically controlled) or die-cutting equipment, the rigidity of the media, and the ability for it to withstand the imaging process temperatures which are typically between 350-400 degrees Fahrenheit (F.) for 1-2 minutes. However, the use of aluminum as a substrate has limitations. Aluminum panels require curved forming or bending to insert them into a phone case, and often the metal bends to a point that exceeds its resiliency and will not return to its original flat shape. Further, such aluminum inserts are generally only 0.040-0.050 inches thick and are therefore easily deformable.

In addition, aluminum inserts are prone to scratching and are easily marred with use thereby detracting from the infused image. A metal insert must be coated with first a white coating and then a clear coating as dye sublimation images require a substantially clear dye receptive coating to receive the image, and a substantially white and light-reflective layer underneath the clear layer. In the case of aluminum the natural color and appearance of the metal requires the white layer to be applied first, with the clear layer to be deposited thereon. Any wear to these layers distorts the images placed thereon by interfering with the desirable scattering of reflected light within the coating.

Another shortcoming of the use of aluminum as the substrate for these phone case inserts is weight. When being shipped in bulk to customers boxes of inserts weigh more than they would if they were made of other lighter substrates, such as plastic. This additional weight also adds cost to the manufacturing of the inserts.

Finally, the greatest shortcoming of the use of a metal substrate, including aluminum, for phone and consumer electronic casing inserts is that metal conducts electricity and interferes with phone signals. In the case of the newer smart phones capable of scanning bar-codes and being employed to pay for items at retail point-of-sale registers, the metallic phone insert completely prevents the phone from operating in the manner intended.

Therefore, what is needed is a manufacturing process to economically produce a non-metal, plastic insert that may be included into a phone case and also facilitate the dye sublimation transfer printing onto that substrate.

SUMMARY OF THE INVENTION

In summary, the present invention is a process of producing a decorated case insert suitable for use on a phone or tablet that applies a synthetic organic polymer coating onto a heat stabilized extruded polymeric substrate, and diffuses a set of disperse dyes in the form of an image into the polymer applied coating through the application of heat and pressure. The decorated insert is then cut to match an article of manufacture, such as a phone or tablet case, and affixed onto that case to form a decorated case.

Other features and objects and advantages of the present invention will become apparent from a reading of the following description as well as a study of the appended drawings.

BRIEF DESCRIPTION OF THE DRAWINGS

An invention incorporating the features of the invention is depicted in the attached drawings which form a portion of the disclosure and wherein.

\*\*Applicant notes that all cross sectional views of the herein depicted portions of the invention are not drawn to scale in the horizontal direction.\*\*

DESCRIPTION OF THE PREFERRED EMBODIMENTS

Figure 1:
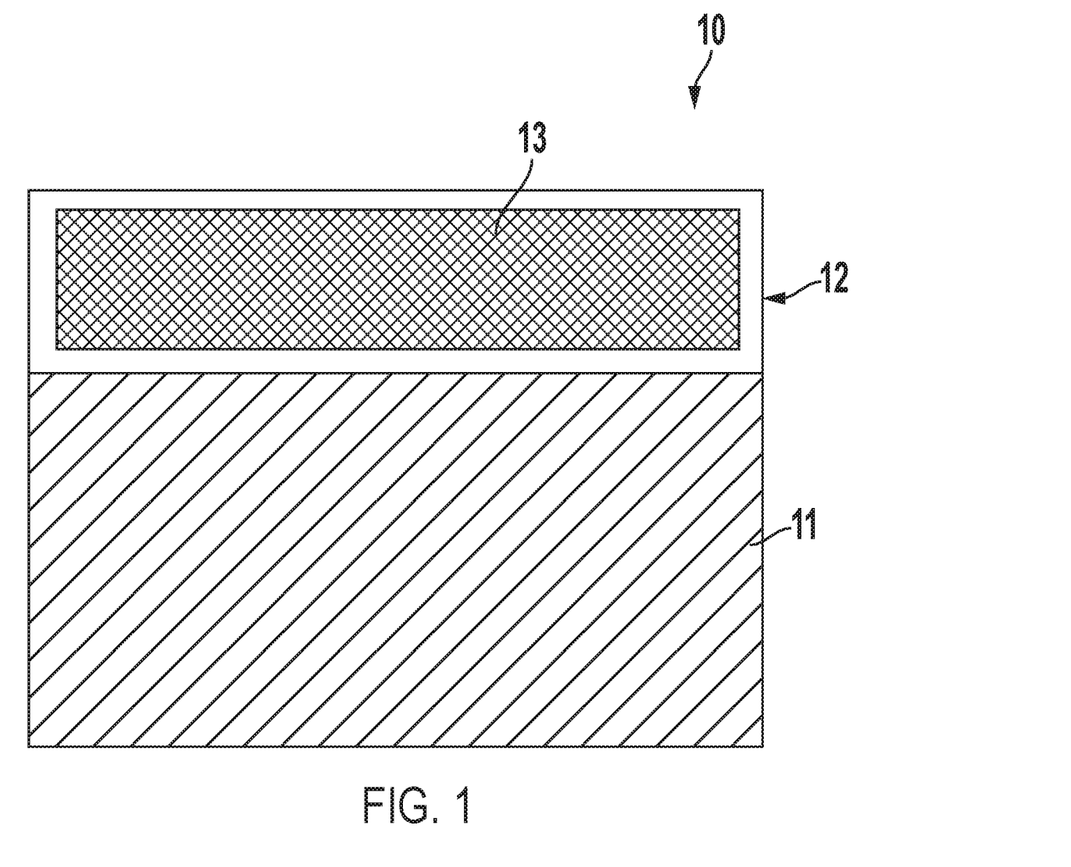
FIG. 1 is a cross sectional diagram of a coated film substrate.

Referring to the drawings for a better understanding of the function and structure of the invention, FIG. 1 shows a cross sectional diagram of a base film substrate 10 comprised of a 0.020" heat stabilized white polyester 11, with an applied coating of 0.005" acrylic urethane 12. The urethane coating includes a nano-particulate of aluminum oxide 13 having a mean particle size of 125 nanometers and a 5% ratio of solids by weight to its host polymer. The particles are optically translucent and at least partially transparent and capable of attenuating visible light within their host polymer medium. This is generally accomplished by the particle having a higher refractive index than an optically clear host polymer.

The host polymer 12 should be a polymer that is a partially transparent, synthetic organic polymer generally being comprised of one or more of the following chemical groups: acrylic, urethane, polyester, fluorinated polymers, epoxies and hybrids of any of the named chemical families, such as acrylic-urethane polyester-urethane.

The coated substrate thickness is critical to the present invention. The inventor determined that a substrate thickness of less than 0.005" does not possess the mechanical and physical resiliency necessary for handling. However, a thickness greater than 0.040" was determined to also be unsatisfactory because the substrate would be too thick to be positioned flush within a cell phone case. Hence, the ideal overall insert thickness was determined to be 0.025" comprising of a 0.020" extruded plastic substrate combined with a 0.005" coating.

The selection of a white polyester substrate is also important. For a phone case insert to manage the demanding process parameters of dye sublimation it must either be inorganic or be selected from a limited number of polymers that at a thickness of less than 0.030" will not shrink more than 2%, and must be capable of withstanding the heat/time cycle of the sublimation transfer process, as will be described. Any greater shrinkage can seriously interfere with the alignment of the case insert, particularly around the windows cut for the camera lens, microphones, and other external phone features. Suitable polymer candidates include polyester, urethane, acrylic, nylon, polyamide, polyethylene and other engineered polymers. However, the two best suited for the herein described processes are either a polyester or polycarbonate substrate, both of which have the ability to be pre-shrunk and capable of being coated after shrinkage. These are also available in a white base, which avoids the necessity of applying a white base coat as is necessary in a metal case.

The use of a polyester or polycarbonate substrate achieves several objectives. First, the insert retains sufficient flexibility to be bent during the insertion or application of the insert to a cell phone case. Secondly, the substrate is capable of being laser cut using conventional low wattage $CO_2$ lasers, rather than requiring heavy duty laser cutting equipment or relatively slow CNC cutting process as when sheet metal is cut. Third, the weight of polyester or polycarbonate substrates is far less than a metal insert and both before and after the herein described process far less shipping costs are incurred. Finally, these polymers are more easily recycled than metal which is creates a better sustainability model.

Figure 2:
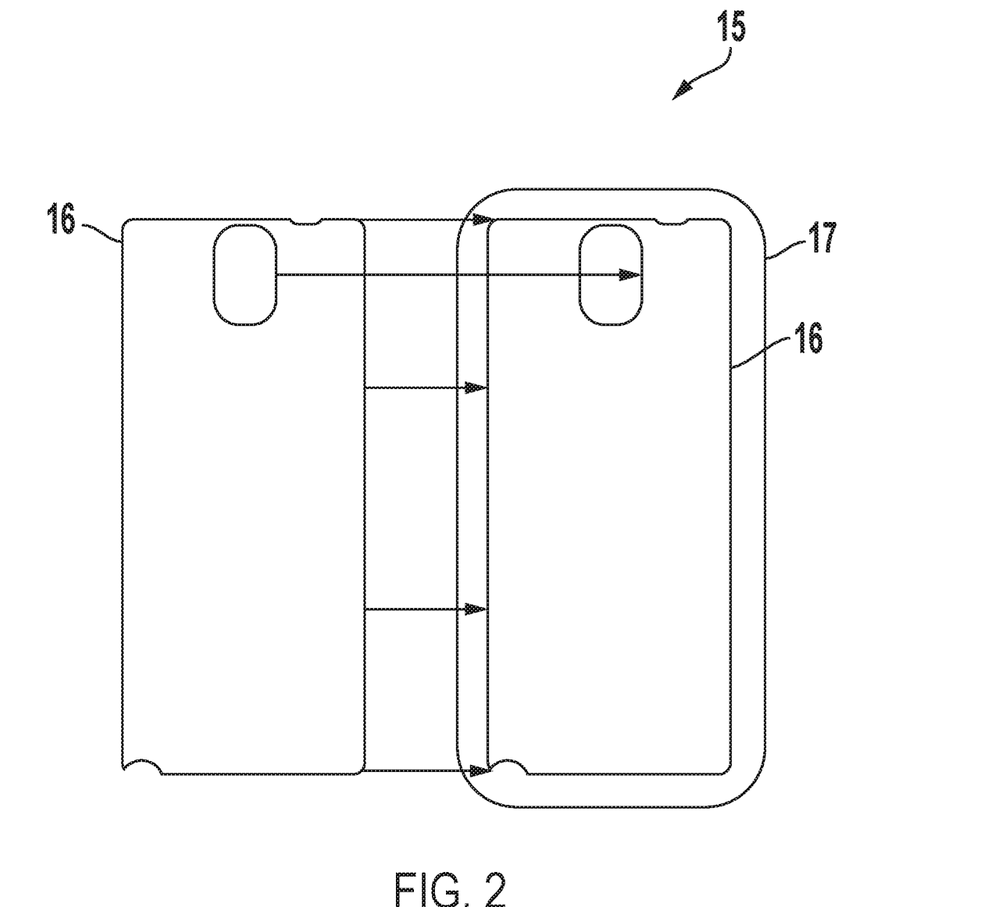
FIG. 2 is an outline view of a cell phone case and a decorated insert cut and sized to be mated with the cell phone case and also positioned within the cell phone case.

As shown in FIG. 2 the insert 16 may be cut using low cost and low wattage $CO_2$ laser cutting tables to conform to a cell phone case 17. A template using the cell phone case as a pattern may be created and used to form the insert 16 into a shape that will accommodate the features of the cell phone case, and as shown easily inserted and affixed to the case.

Figure 3:
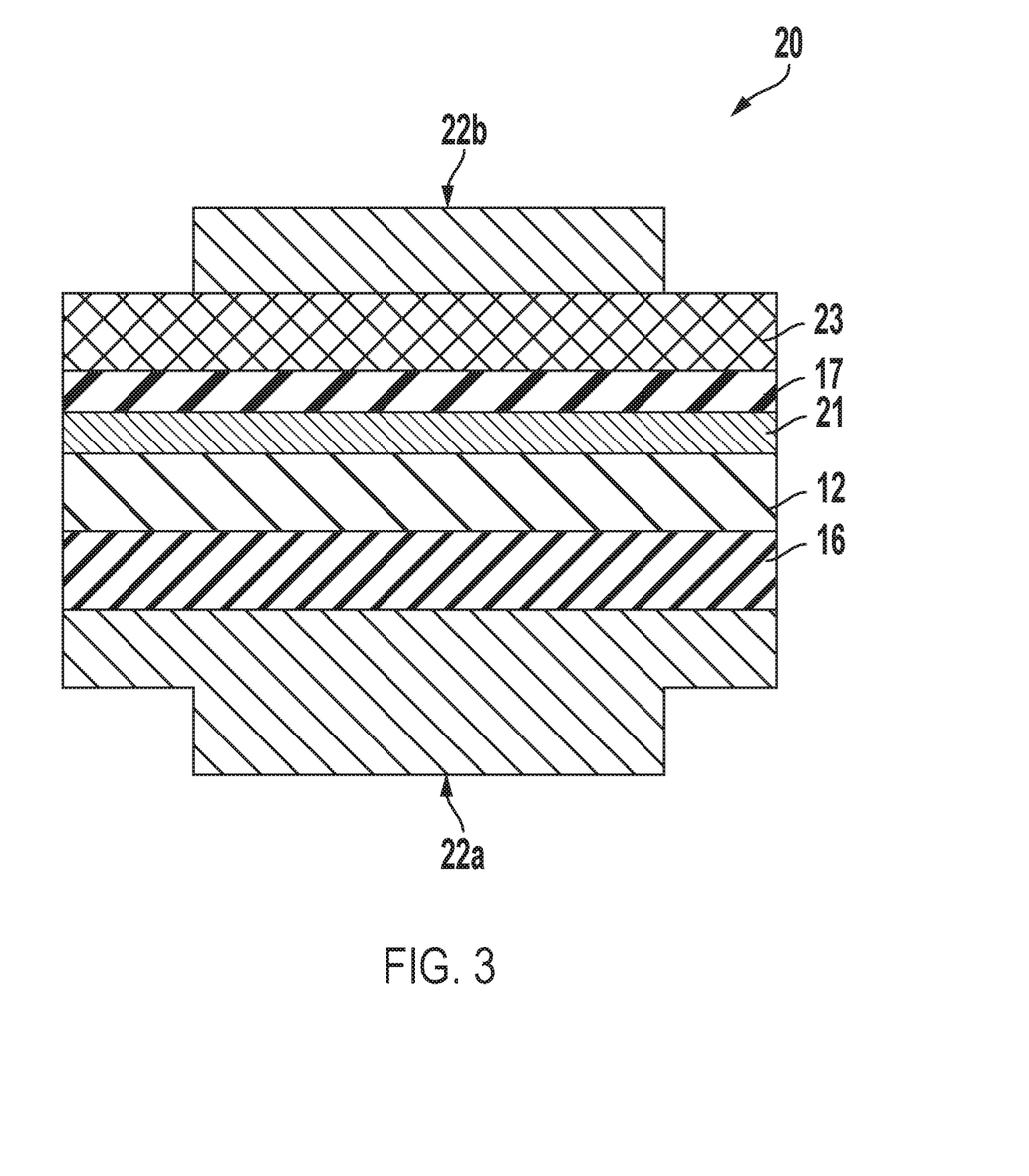
FIG. 3 is a cross sectional view of a coated cell phone case insert positioned within a heat press prepared for the thermal transfer of a dye-sublimation image onto a polymer applied coating.

Referring now to FIG. 3, it may be seen a transfer process arrangement with several elements arranged to achieve the proper transfer of a dye sublimation image into a coated substrate as disclosed in FIG. 1. A substrate 16 with a coating 12 (see FIG. 1 above) is position on a typical heat press lower platen press arrangement 22a to provide pressure from underneath substrate 16 and to support the layering arrangement of 20 during the application of pressure and heat, pursuant to step 47 in process 40 shown in FIG. 6. A layer of dispersible dye 21 that is held by transfer medium 17, such as paper designed to receive and release disperse dyes, is positioned with the dye facing downward against coating 12 and in direct contact thereof. As will be understood, the application of the dye on the paper may be formed into an image or, depending upon the resolution of the printing process, even a photograph reproduction. The above positioned transfer medium 17 is arranged below a heated platen 23 supported by heat press member 22b. As will be further discussed, the closing of the members 22a,b and the application of heat through platen 23 creates an environment of heat and pressure suitable for the transfer of the dispersible dye into coating 12.

Figure 4:
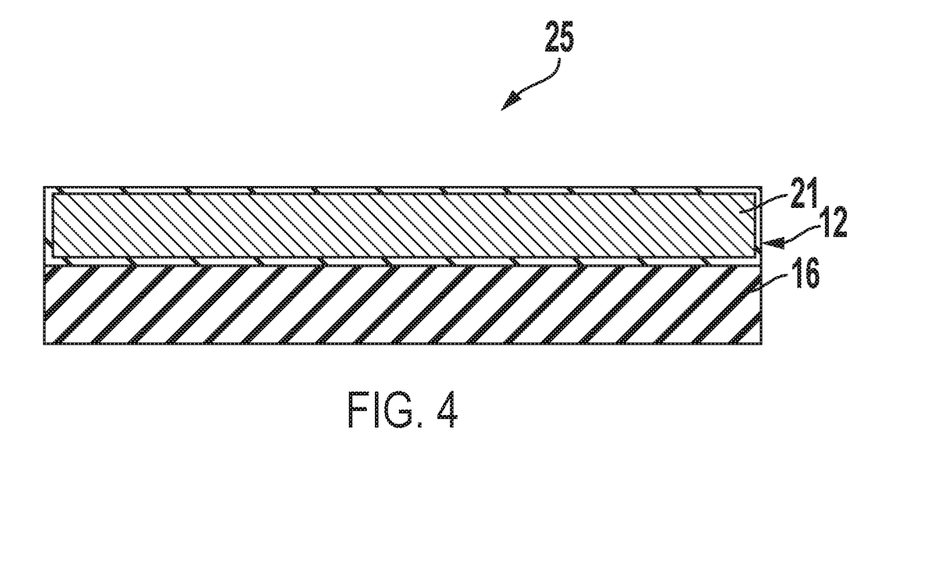
FIG. 4 is a cross sectional view of the decorated substrate media showing the diffusion of the dye into the coating.

The result of the application of heat and pressure through the arrangement 20 shown in FIG. 3 results in a dye diffused substrate 25 as shown in FIG. 4. Substrate 16 supports coating 12 having formed therein diffused dye 21 which is typically formed in an image as originally printed onto transfer medium 17. Following sublimation and diffusion of the dyes and removal of heat and pressure, the dyes return to a solid state by deposition, and are now positioned within the polymeric matrix of the polymer coating and will remain for the life of the coating. The arrangement 25 now constitutes an article of decorated media suitable for placement on a cell phone case.

Figure 5:
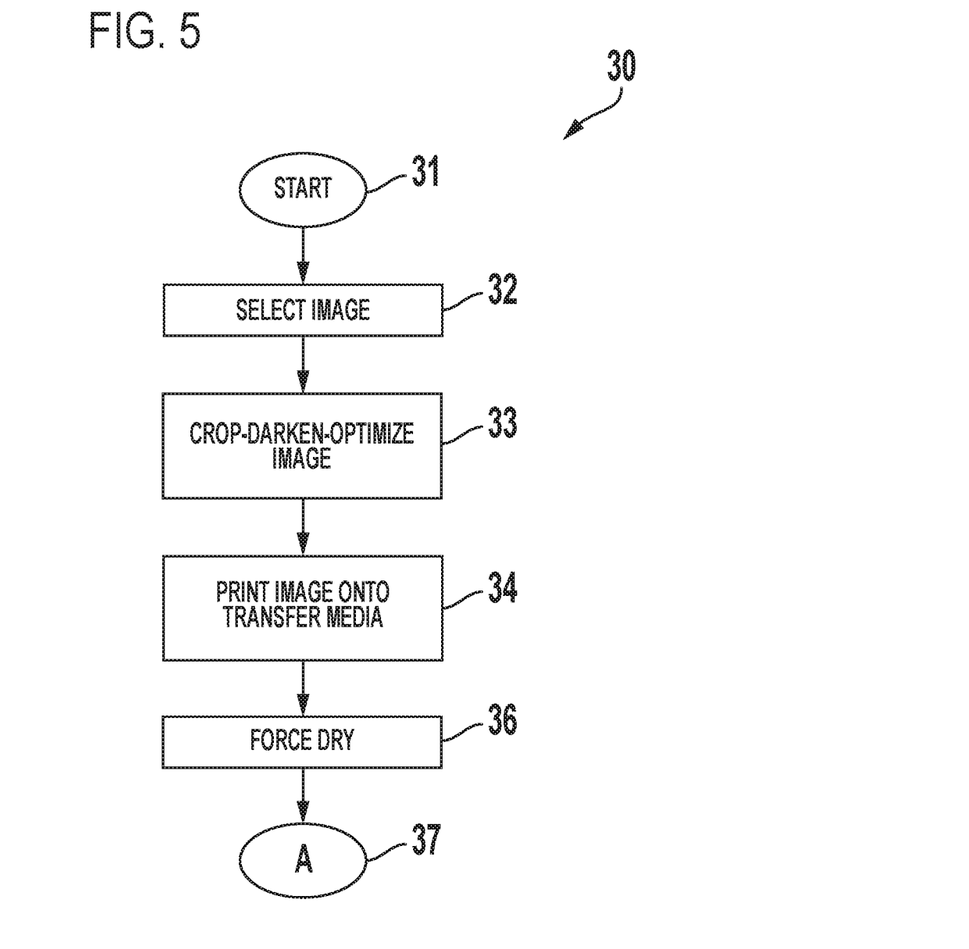
FIG. 5 is a process diagram showing the creation of a transfer media having a dye sublimation image formed thereon; and, FIG. 6 is a process diagram showing the application of the image transfer media onto an insert substrate and affixation onto a cell phone case.

Referring now to FIG. 5, it may be seen that the transfer media 17 with dispersible ink 21 shown in arrangement 20 of FIG. 4 includes a preparation process 30 to arrive at a suitable combination. After an image for printing is selected 32, a step of image optimization 33 is initiated to compensate for the dye sublimation process. In particular, what may seem to be an excellent image on the transfer media likely will have characteristics too weak to result in an image in the decorated insert due to it being washed out or insufficiently vibrant. This is because nano-composite particles in translucent coating are milky or frosted in appearance which renders a seemingly well printed image washed out due to light scattering. Hence, additional and exaggerated brilliance/saturation, and some darkening, maybe necessary to compensate for the additional light scattering and to render an attractive image in the final imaged coating.

The optimized image in step 33 is then printed onto a transfer media (typically paper) 34, and then dried with forced air or convection heating. The transfer media and image are now ready for utilization in process 40 at insert point A 37.

Figure 6:
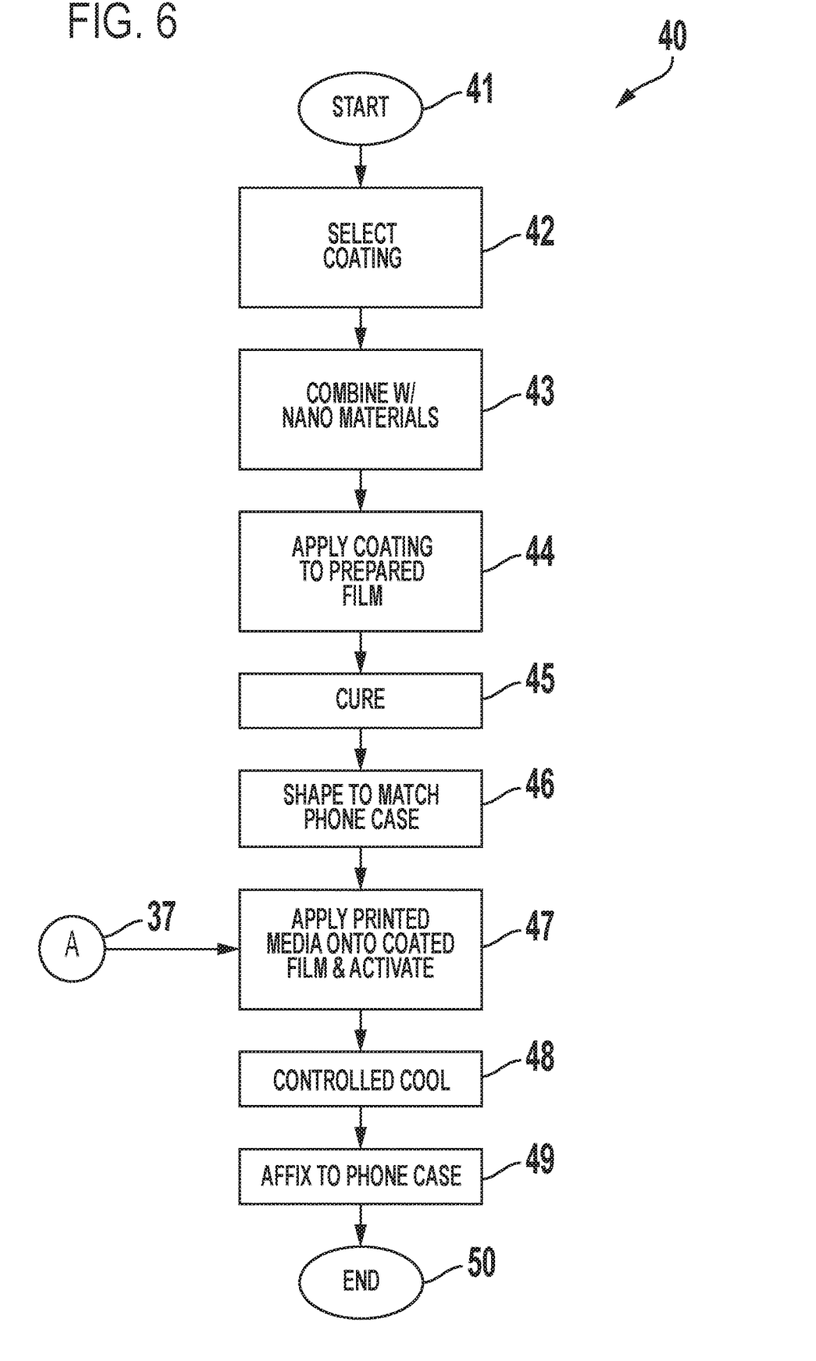

A complete process to form the decorated insert 25 of FIG. 4 may now be seen in FIG. 6. Initially, a coating for the article is selected 42 to ensure dispersion of ink and suitable light scattering to allow for any transferred image to be well defined and attractive. A preferred coating is acrylic urethane applied at a thickness of 0.005". However, a coating thickness of between 0.0015" and 0.005" is satisfactory. The preferred coating is a polymer containing a chemically catalyzed urethane (as opposed to a heat activated polymerization, or a UV/EB photo-induced catalytic reaction, or an air-based curing) to impart flexibility, and be capable of receiving the diffused disperse dyes and further to better adhere to the base substrate. The plural component chemical reaction is the preferred method as it enables a high crosslink density higher than air cured polymers, but without the brittleness of UV/EB cured coatings and without the problems of heat activated polymerization which often requires exposure to temperatures higher than desirable, which may cause warping or yellowing. The preferred plural component catalytic reaction can be expedited by heat, but while maintaining a temperature below a safe material threshold.

The urethane coating is then combined with light attenuating nano-materials 43 to achieve satisfactory reflective coating properties. Aluminum oxide with a mean particle size of 125 nanometers and in a 5% ratio of solids by weight to the urethane medium provides a suitable mixture. Nano particles of white metal oxides were determined to be the best overall performers, in addition to imparting physical improvements they also enables the coating to resist yellowing during the thermal image transfer cycle. Specifically nano-particles of aluminum oxide, titanium dioxide, zirconium oxide and cerium oxide are the best overall performers and are all commercially available at relatively economically prices. Integration of these nanoparticles is most effective in loading levels of 5%-15% when using a mean particle size of 50-150 nm.

The coating mixture is then applied to a suitable film substrate 44. Prior to the application of the coating to the substrate, it is important that the substrate is "pre-shrunk" so that during the dye application the insert will not be distorted once released from the heat press. This is called substrate stabilization and can be accomplished by either pretreatment of the base substrate by exposing it to temperature of between 350-400 degrees Fahrenheit for 1-2 minutes, or by adjusting its original size to be slightly larger to compensate for shrinkage.

Heat stabilized polyester and other films are typically pre-shrunk to allow subsequent exposure of the film to temperatures not exceeding 200 degrees Fahrenheit. In the case of dye-sublimation, articles to be decorated by a process are required to withstand temperatures exceeding 350-400 degrees for 1-2 minutes and in the case of some substrates, even longer. Therefore it is necessary for the purpose of the present invention to have an additional pre-shrinking step to ensure that the substrate film does not shrink during the dye-sublimation process. It is also necessary to pre-shrink the film before any coating is applied because doing so afterwards causes damage to the coating. Some polymer sheets are heat stabilized, but they typically not "pre-shrunk" to the extent necessary to prevent substantial shrinking during a dye sublimation process. Hence, the term "pre-shrink" also refers to a pre-sized part that will fit a cell phone case exactly after a heating press process so that a second stabilizing process may be applied either before or after the coating is applied. It is preferred to adjust the CAD cut out of the part to allow for the shrinkage. The CAD cutting dimensions are designed to be larger than the intended final part to allow for shrinkage during the imaging process. For example, if a part decorated substrate is intended to be 40×50 mm after imaging it will be designed to be 42×53 mm before imaging to ensure that the case meets the cell phone case.

Therefore, while pre-shrinking the substrate is one way of preventing the phone insert from shrinking during the heat pressing cycle, it adds cost to the production process. Therefore the alternative process of adjusting the insert size prior to cutting works satisfactorily and is less expensive than using a heat pre-shrink step. Therefore the phone case insert is initially cut slightly larger than the intended final dimensions to accommodate the heat press image-transfer cycle.

Irrespective, it is important that after pre-shrinking the substrate continues to exhibit a fluid contact behavior of "wet out." "Wet out" refers to a surface characteristic where the surface tension/energy of the liquid coating as compared to the surface tension/energy of the surface being coated does not cause beading of the coating. If the liquid has a greater surface energy than the substrate coating it will "bead-up" like, for example, when water is applied to a Teflon™ coated surface. If the surface has higher energy the coating "wets out" and the application of a coating will uniformly cover the substrate and bond well to it.

As may be understood, other additives may also be introduced into the coating. For example anti-microbial agents, self-cleaning agents (silver, photo reactive chemicals, or titania), or hardening enhancements such as alumina or zirconia may be added.

After the coating is applied to the film substrate the coated substrate is cured 45. Inducing the cure chemically by the addition of a catalyst results in optimal properties. Thermal curing requires a substrate film to be raised in temperature for too long a duration causing waviness in the substrate, and photo-initiated curing and electron-bean curing results in a brittle coating. Both are hence unsatisfactory. In addition, UV and EB cured coatings did not bond sufficiently well, and this combined with the brittleness of the UV or EB cured coatings causes delamination and cracking when the insert is flexed or subjected to substantive physical forces. Single component air dry coatings also do not possess the crosslink density needed for dye-sublimation and soften too much during the transfer process. Therefore chemical catalysts are preferred as a curing mechanism for the herein described plastic phone case inserts.

After properly curing, the coated substrate is shaped to match a phone case dimensions and external features 46. This can be accomplished using various cutting and forming machines, but low power laser cutting tables work most economically. Further description regarding the use of laser cutting tables or similar industrial cutting processes is omitted as such information is well understood in the industry and unnecessary for a complete understanding of the herein described processes.

The transfer media with dye image from process 30 is then combined from A 37 with the coated substrate in a heat-press configuration 47. Specifically, the arrangement 20 shown in FIG. 3 is assembled and heat and pressure applied via the heat press until dyes have transferred into the substrate coating. Satisfactory dye transfer typically occurs when pressures of 30-70 PSI are applied in combination with 350-400 degrees Fahrenheit for 1-2 minutes. Pressures of 350 degrees Fahrenheit for 2 minutes or, alternatively, 400 degrees Fahrenheit for 1 minute are suitable for transfer. The combination of the heat and pressure also cause an activation of the dye to diffuse into the substrate coating, thereby creating a strong bonding within the coating and yielding a persistent long-term image.

Cooling 48 occurs at a natural rate after extraction from the heat press, but it is preferred that a weighted heat sink such as a glass or metal panel be placed over the diffused substrate until cooled. This facilitates natural cooling at a preferred and uniform rate, while maintaining a modicum of pressure over the substrate. The decorated insert is then affixed to the phone case 49 as may be understood in the industry.

While I have shown my invention in one form, it will be obvious to those skilled in the art that it is not so limited but is susceptible of various changes and modifications without departing from the spirit thereof.

Having set forth the nature of the invention, what is claimed is:

1. A method for making a decorated case insert, comprising the steps of:
   a. applying an organic polymer coating onto a heat stabilized extruded polymeric substrate, said coating including a polymer of urethane with nano-sized particles of white metal oxides in a ratio of at least 5% of solids by weight;
   b. curing said mixture on said film to form a reflective coating;
   c. positioning a dye sublimation transfer media having a layer of dispersible dyes over said polymer coating wherein said dyes are in contact with said coating;
   d. diffusing said dyes into said polymer coating through the application of heat and pressure surrounding said polymeric substrate, wherein said step of applying heat and pressure includes applying pressure of at least 30 PSI and applying heat of at least 350 degrees Fahrenheit;
   e. allowing the diffused substrate to cool; and,
   f. cutting said polymeric substrate into a shape suitable for a case insert for personal electronics.

2. A method for making a decorated case insert as recited in claim 1, further comprising prior to said step of positioning a transfer media over said polymer coating the additional steps of:
   a. selecting an image for transfer via said transfer media;
   b. optimizing the appearance of said image for a dye sublimation transfer;
   c. printing said optimized image onto said transfer media with dyes suitable for sublimation transfer from said transfer media upon the later application of heat in a transfer process; and,
   d. drying said dyes onto said transfer media.

3. A method for making a decorated case insert as recited in claim 2, wherein said stabilized extruded polymeric substrate in said coating step comprises a thickness of at least 0.020 inches.

4. A method for making a decorated case insert as recited in claim 3, wherein said of step of applying an organic polymer coating onto a heat stabilized extruded polymeric substrate includes applying nano-sized particles selected from the group comprising aluminum oxide, titanium dioxide, zirconium oxide and cerium oxide.

5. A method for making a decorated case insert as recited in claim 4, wherein said of step of applying an organic polymer coating includes utilizing a base polymer mixture selected from the group consisting of acrylic, urethane, polyester, fluorinated polymers, and epoxies.

6. A method for making a decorated case insert as recited in claim 1, wherein said of step of applying an organic polymer coating results in a coating thickness of at least 0.005 inches.

7. A method for making a decorated case insert as recited in claim 6, wherein said step of diffusing said dyes into said polymer coating includes the application of pressure of between 30 and 70 PSI and the application of heat to raise the coating temperature to between 350 and 400 degrees Fahrenheit.

8. A method for making a decorated case insert as recited in claim 7, wherein said case insert is applied to a cell phone case.

9. A method for making a decorated case insert as recited in claim 8, wherein said step of cutting said decorated substrate to fit a personal electronics case includes the use of a low-powered $CO_2$ laser for said cutting.

10. A method for making a decorated plastic sheet suitable for insertion into a cell phone case, comprising the steps of:
    a. mixing a polymer of chemically catalyzed urethane with particles of white metal oxides particles having a mean particle size of between 50 and 150 nanometers in a ratio of at least 5% of solids by weight;
    b. applying said metal oxide mixture to a pre-shrunk, heat stabilized polyester substrate film to form a dye receptive coating;
    c. curing said mixture on said film to form a reflective coating;
    d. positioning a dye sublimation transfer media adjacent to said coating with said dye applied against said coating;
    e. placing the materials layering of said transfer media and said substrate film in a heat press and applying between 30 and 70 PSI at between 350 and 400 degrees Fahrenheit to said materials layering until said dye diffuses into said reflective coating;
    f. cooling said substrate film; and,
    g. affixing said decorated substrate film to a personal electronics case.

11. A method for making a decorated case insert as recited in claim 10, wherein said of step of applying a metal oxide mixture to said film includes applying said nano-sized particles selected from the group consisting of aluminum oxide, titanium dioxide, zirconium oxide and cerium oxide.

12. A method for making a decorated case insert as recited in claim 11, wherein said step of diffusing said dyes into said polymer coating includes the application of pressure of between 30 and 70 PSI and the application of heat to raise the coating temperature to between 350 and 400 degrees Fahrenheit.

13. A method for making a decorated case insert as recited in claim 12, wherein said case insert is sized to be applied to a cell phone case, and wherein said decorated substrate film is cut into a form for mating to said insert to a cell phone case using a low-power $CO_2$ laser.

14. A method for making a decorated case insert as recited in claim 10, wherein said of step of applying an organic polymer coating includes utilizing a base polymer mixture selected from the group consisting of acrylic, urethane, polyester, fluorinated polymers, and epoxies.

15. A method for making a decorated case insert as recited in claim 14, wherein said stabilized extruded polymeric substrate film in said coating step comprises a thickness of ate least 0.020 inches.

16. A personal electronics case insert for decorating said same, comprising:
   a. a pre-shrunk, heat stabilized polyester film coated with a polymer of chemically catalyzed urethane having particles of white metal oxides having a mean particle size of between 50 and 150 nanometers in a ratio of at least 5% of solids by weight;
   b. wherein said polymer coating comprises a translucent and reflective surface on said polyester film;
   c. disperse dyes formed into a human discernable image and diffused into said coating, wherein said dispersed dyes have been exposed to pressure of at least 30 PSI and heat of at least 350 degrees Fahrenheit during diffusement; and,
   d. wherein said decorated film is shaped to fit a case for a personal electronics device and applied thereon to decorate said device.

17. A personal electronics case insert as recited in claim 16, wherein said film comprises a thickness of at least 0.020 inches.

18. A personal electronics case insert as recited in claim 17, wherein said organic polymer coating includes said nano-sized particles selected from the group consisting of aluminum oxide, titanium dioxide, zirconium oxide and cerium oxide.

19. A personal electronics case insert as recited in claim 18, wherein said organic polymer coating includes utilizing a base polymer mixture selected from the group consisting of acrylic, urethane, polyester, fluorinated polymers, and epoxies.

20. A personal electronics case insert as recited in claim 18, wherein said organic polymer coating comprises a coating thickness of at least 0.005 inches.

* * * * *